Jan. 22, 1963   M. KAPILOW   3,074,311
MOTION PICTURE VIEWER
Filed Nov. 16, 1959   5 Sheets-Sheet 1
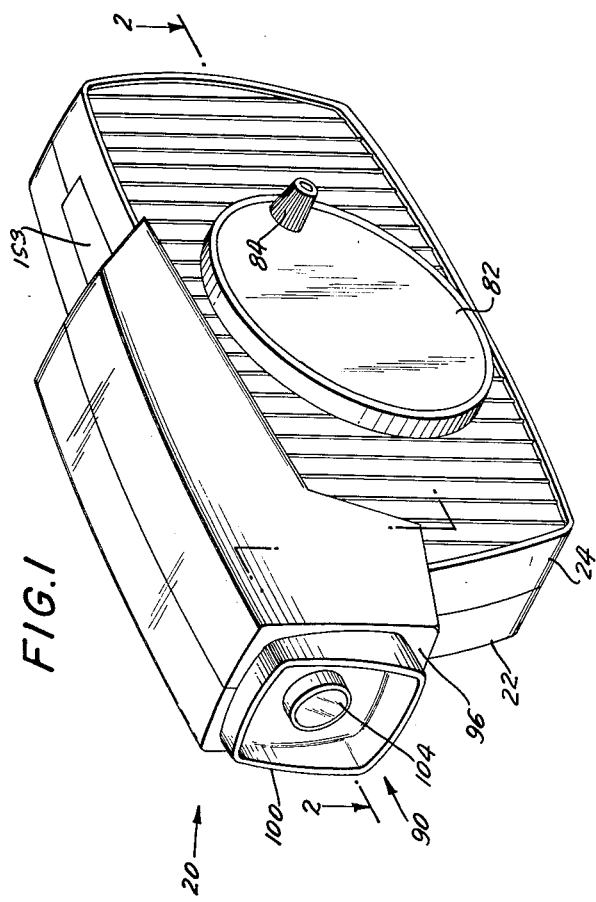
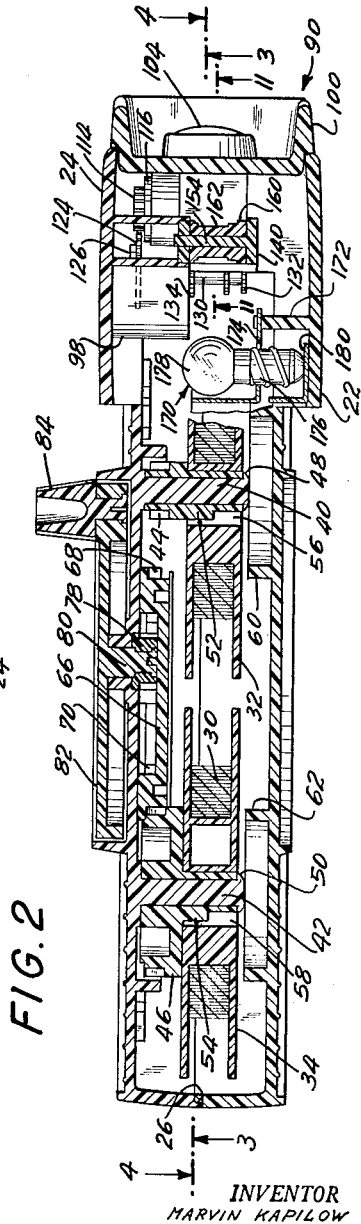
INVENTOR
MARVIN KAPILOW
BY
Kane, Dalsimer and Kane
ATTORNEYS

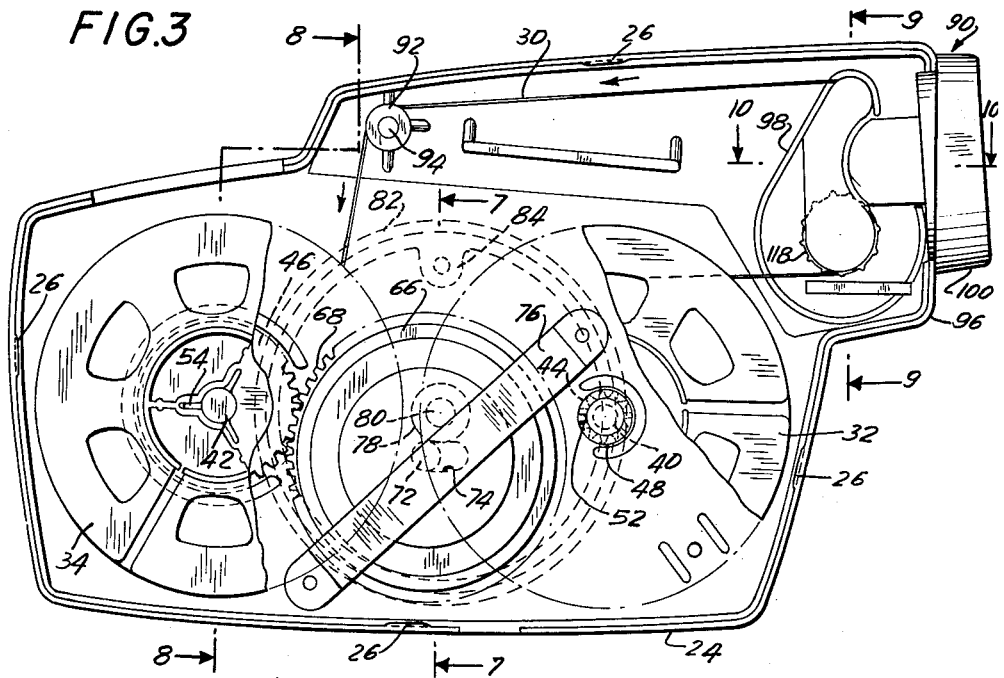

Jan. 22, 1963   M. KAPILOW   3,074,311
MOTION PICTURE VIEWER
Filed Nov. 16, 1959   5 Sheets-Sheet 3

INVENTOR
MARVIN KAPILOW

BY
Kane, Dalsimer and Kane

ATTORNEYS

Jan. 22, 1963   M. KAPILOW   3,074,311
MOTION PICTURE VIEWER
Filed Nov. 16, 1959   5 Sheets-Sheet 4

INVENTOR
MARVIN KAPILOW

BY
Kane, Dalsimer and Kane

ATTORNEYS

Jan. 22, 1963

M. KAPILOW 3,074,311

MOTION PICTURE VIEWER

Filed Nov. 16, 1959

INVENTOR
MARVIN KAPILOW

BY
Kane, Dalsimer and Kane

ATTORNEYS

United States Patent Office 3,074,311
Patented Jan. 22, 1963

3,074,311
MOTION PICTURE VIEWER
Marvin Kapilow, 15 Wells Ave., Croton-on-Hudson, N.Y.
Filed Nov. 16, 1959, Ser. No. 853,031
6 Claims. (Cl. 88—17)

The present invention relates to a motion picture viewer, and more particularly to a portable motion picture viewer which permits the viewing of motion picture film at substantially any place and any time.

An object of the invention is to provide a self-contained, light-weight and compact viewer which has an improved rewind mechanism and which is easily loaded and may include a battery-operated light source.

Another object is to provide a viewer which can be loaded in a relatively short period of time by a person with average manual dexterity, and operated under such circumstances by simply pressing a button which switches on a battery-operated light source and turning a conveniently located crank handle to activate the film.

A further object is to provide a viewer wherein focusing is unnecessary and film to be viewed activated by simply turning a crank handle in the direction of the film advance mechanism while, at the same time, incorporating mechanism for rewinding the film at a speed equal to approximately four times that at which the film moves forward by advantageously turning the handle in a reverse direction.

Still another object is to provide a viewer for motion picture film permitting the user to view single frames at will and facilitating editing in that the user observes his picture in action as slow or as fast as he wishes, thereby better enabling him to decide on sections to eliminate.

A still further object is to provide a portable motion picture viewer which is of relatively light weight and conveniently accepts a standard 50 ft. roll of color or black and white film of standard size such as 8 mm. motion picture film.

An important object is to provide a relatively inexpensive light-weight portable motion picture viewer embodying a minimum number of parts, which are readily assembled at minimum cost, and which is capable of being operated efficiently at substantially any place and any time without exercising any degree of skill.

A motion picture viewer constructed in accordance with the present invention includes a casing embodying a pair of parts which are coupled to one another and releasable upon the application of deliberate manual pressures. An eye piece is mounted by the casing and is formed with an aperture across which a magnifying lens is positioned. A rotatable prism is located within the aperture and forms part of a shutter mechanism which alternately opens and closes the aperture. Under such circumstances, the lens is exposed with the prism located interiorly thereof and within the confines of said casing.

A light source, including a battery-operated light, is positioned within the casing to advantageously direct light from within the casing out through the lens when the shutter mechanism is open. In this connection, a manually operable switch arm is exposed through the casing in such a manner that upon deliberate shifting of this arm, a normally opened switch is closed to thereby permit the actuation of the light by the battery.

A film supply reel and take-up reel are both rotatably and removably mounted interiorly of said casing. A supply of film to be viewed under such conditions is usually wound on the supply reel with a loop of the film passing between the light source and shutter mechanism and the leading end of the film suitably guided onto the take-up reel. A sprocket wheel having its sprocket teeth in engagement with the sprocket receiving openings of the film to be viewed rotates the prism of the shutter mechanism upon actuation of the film through a suitable coupling. Under such circumstances, the sprocket wheel and shutter mechanism are synchronized in such a manner that a full picture frame will be disposed across the eye piece aperture when the prism of the shutter mechanism is in its open position. An improved crank-operated drive mechanism actuates the film by either winding it on the take-up reel or rewinding it on the supply reel. Thus, with the light source energized, the entire reel of film can be viewed through the lens by properly operating the drive mechanism and rewound when the picture frames on the film have been terminated as the other film end is approached or reached.

Other objects and advantages will become apparent from the following detailed description which is to be taken in conjunction with the accompanying drawings illustrating a preferred embodiment of the invention, and in which:

FIG. 1 is a perspective view of this embodiment in assembled form;

FIG. 2 is an enlarged sectional view taken along the line 2—2 of FIG. 1;

FIG. 3 is a longitudinal view of the interior of the casing viewed in the direction of the arrows 3—3 upon the removal of one of the casing covers;

FIG. 4 is a similar view of the interior of the other casing cover, as viewed in the direction of the arrows 4—4 of FIG. 2;

Figure 5:
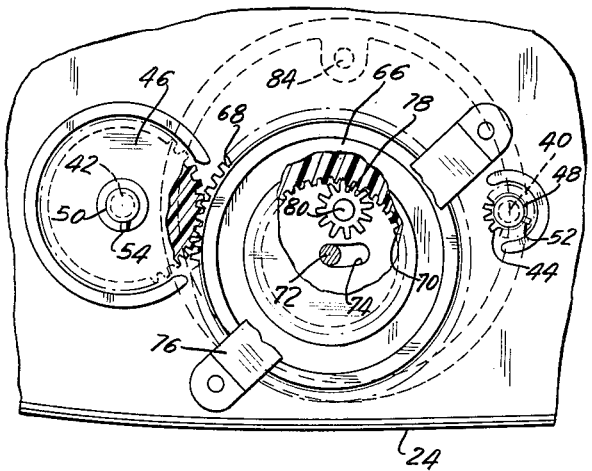
FIG. 5 is a fragmentary view of the drive means, with certain parts broken away and sectioned, showing the floating gear meshed with the take-up reel gear.
Figure 6:
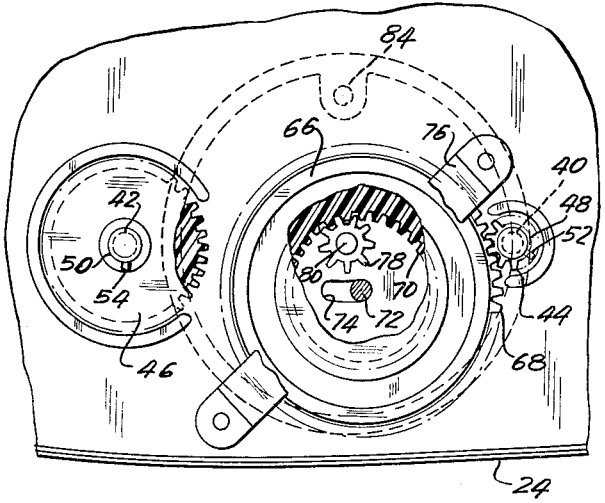
FIG. 6 is a similar fragmentary view, with certain parts broken away and sectioned, illustrating this floating gear in engagement with the film supply reel gear.
Figure 7:
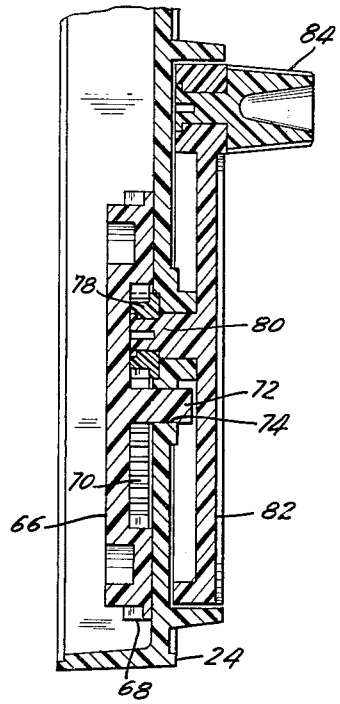
FIG. 7 is a sectional view taken along the line 7—7 of FIG. 3.
Figure 8:
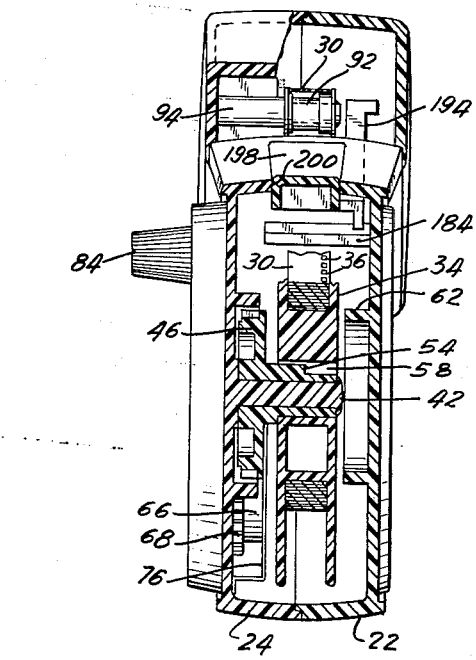
FIG. 8 is a sectional view taken along the line 8—8 of FIG. 3.
Figure 14:
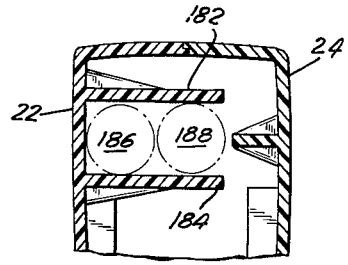
FIG. 14 is a fragmentary sectional view taken along the line 14—14 of FIG. 4.
Figure 13:
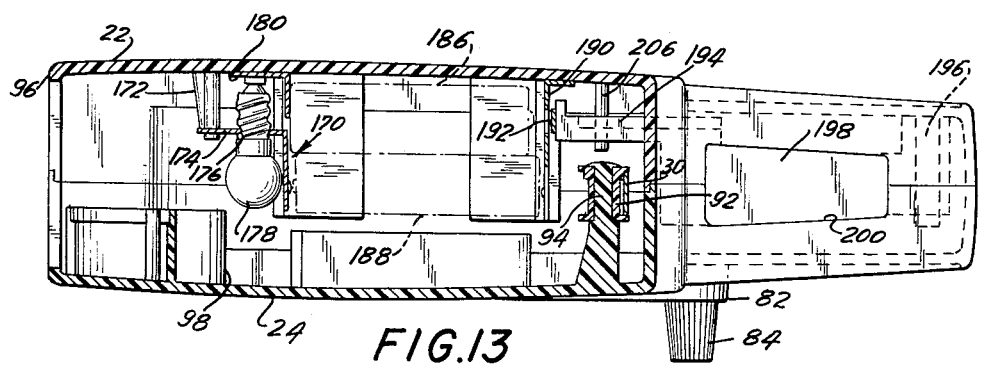
FIG. 13 is a sectional view taken along the line 13—13 of FIG. 4.
Figure 9:
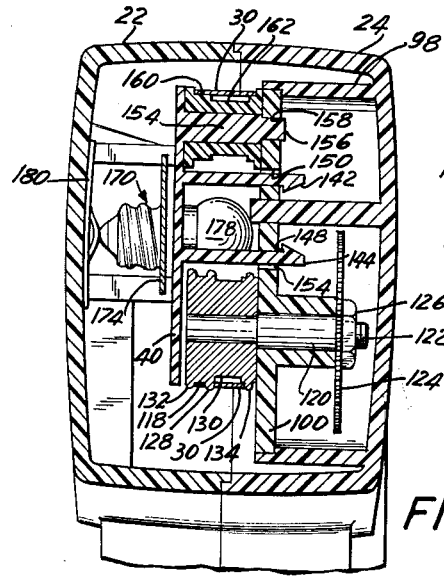
FIG. 9 is a sectional view taken along the line 9—9 of FIG. 3.
Figure 10:
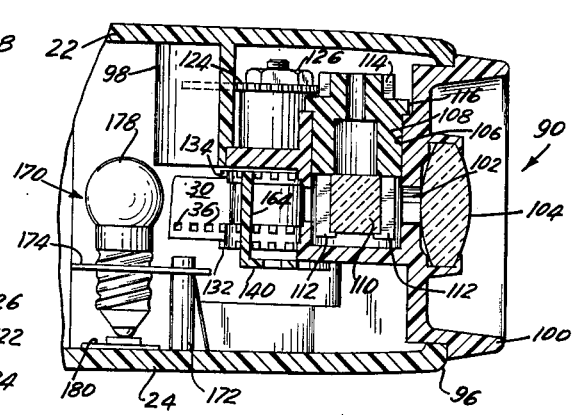
FIG. 10 is a sectional view taken along the line 10—10 of FIG. 3.
Figure 11:
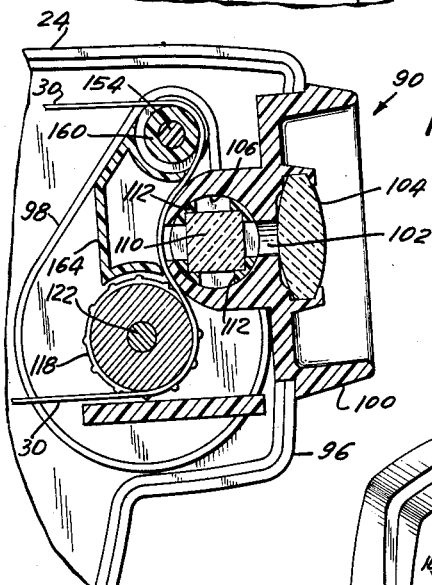
FIG. 11 is a fragmentary sectional view taken along the line 11—11 of FIG. 2.
Figure 12:
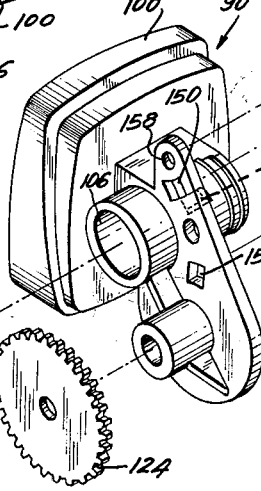
FIG. 12 is an exploded perspective view of the eye piece including the shutter mechanism, sprocket wheel and the drive connection therebetween.

In accordance with the preferred embodiment of this invention, a motion picture viewer 20 comprises a casing or housing formed from two mating covers or parts 22 and 24 which are adapted to be releasably secured to one another through their contacting peripheral edges. These edges are oppositely ridged and shouldered to afford a sealing fit when closed. A series of interconnecting protuberance and recess means 26 are advantageously located and are adapted to releasably latch the covers 22 and 24 to one another through the cooperation of the inherent resiliency and flexure of the material from which the casing 20 is formed. In this connection, the covers 22 and 24 may be molded from a suitable resin, such as commercially available styrene, possessing the desired characteristics.

Film 30, which is to be viewed, is placed on a film supply reel 32 to be ultimately wound around a film take-up reel 34 during the contemplated viewing process. For purposes of the present embodiment, 8 mm. motion picture film is employed and may be a standard length of 50 ft., for example. Under such circumstances, this film 30 will have spaced sprocket receiving openings 36 extending along one edge thereof. Thus, the reels 32 and 34 are adapted to accommodate this length of film, and under the contemplated conditions of viewer use, both of these reels may be substantially identical and, therefore, provide effective reel interchangeability.

The casing cover 24 is provided with a pair of inwardly projecting studs 40 and 42, which rotatably mount gears 44 and 46, respectively. Bosses 48 and 50 extend integrally from their associated gears 44 and 46 and embrace the mounting studs 40 and 42, respectively. Suitable positions are preferably employed for preventing relative axial movement between the gears 44 and 46 and the studs 40 and 42, respectively, as for example flaring their free ends. The bosses 48 and 50 each include radially projecting keys 52 and 54, respectively, which are adapted to be received by one of a series of suitably formed radial slots 56 and 58, respectively, which are formed in their associated reels 32 and 34.

The other cover 22 has inwardly extending spacers 60 and 62 of substantially cylindrical form in concentric relationship with respect to studs 40 and 42, respectively. Accordingly, undue axial movement of the reels 32 and 34 will be prevented when the reels are properly mounted on their associated gears 44 and 46 and the casing cover members 22 and 24 properly latched to one another. Thus, it should be evident that upon disassociation of the casing covers 22 and 24, the reels 32 and 34 may be either removed from their respective gears 44 and 46 or mounted thereon for rotation therewith. As will be appreciated, the gear ratio between gears 44 and 46 is more than 1:1, and, under the contemplated conditions, is selected to be approximately 1:4. Accordingly, under substantially the same drive conditions which will be described shortly, the take-up reel will rotate approximately ¼ as fast as the supply reel 32.

In addition to the gears 44 and 46, the drive for the reels 32 and 34 includes a floating or shiftable gear 66. This floating gear 66 includes circumferential gear teeth 68 at its outer periphery for meshing with the teeth of either gear 44 or 46. The side face of gear 66 which is disposed immediately adjacent the inner wall face of the casing cover 24 is recessed and is there provided with internal gear teeth 70 which extend radially inwardly. A concentrically located stud 72 extends integrally from the gear 66 and is adapted to travel or ride in an arcuate slot 74 formed in the casing cover 24. An elongated leaf spring 76 is anchored at both of its ends to the inner surfaces of the case cover 24 and is biased in such a manner as to exert pressure against the floating gear 66 and thereby cause it to bear firmly against the case cover 24. The slot 74 is of a length that will permit the circumferential teeth 68 of the floating gear 66 to mesh with the teeth of gear 46 when the stud 72 travels to one slot end and similarly engage the teeth of gear 44 when the stud 72 is at the other slot end.

A pinion gear 78 is fixedly mounted on a stud 80 extending integrally from disc 82 through a suitably formed bore in the case cover 24. This disc 82 functions as a crank and is provided with an outwardly projecting handle 84 for such purpose proximate its peripheral edge. As will be observed, the slot 74 is concentric with the pinion gear 78 which, in turn, is adapted to mesh with the teeth 70 of the floating gear 66. Through the application of pressure by the leaf spring 76 against the floating gear 66, rotational movement in either direction of the crank 82 will rotate the pinion 78 such that the gear 66 will shift through its stud 72 with respect to the slot 74. Under such circumstances, this stud 72 will ultimately engage an end of the slot 74, at which time the teeth 68 will engage the particular reel gear 44 or 46 as the case may be. Further rotation of the crank 82 will consequently result in the pinion 78 imparting rotation to the floating gear 66 so that the engaged reel gear will be rotatably driven.

Thus, when the crank 82 is turned clockwise, the pinion gear 78 will rotate accordingly to shift the floating gear 66 into engagement with the take-up gear 46 and thereby wind the film on the take-up reel 34. Counterclockwise rotation of the crank 82 will cause the gear 66 to shift into engagement with the supply reel gear 32, and consequently rotate the supply reel to effect a rewinding of the film 30.

In passing from one reel to the other, the film 30 is guided through an eye piece 90 and over a guide spool 92 which is rotatably mounted on stud 94 extending integrally from the inner face of case cover 24.

The eye piece 90 is conveniently mounted by the projecting casing front end 96 and inwardly projecting wall 98 which is an integral part of the case cover 24. The wall 98 defines a chamber for accommodating a shutter mechanism and drive therefor which form part of the eye piece 90. Under the circumstances, the eye piece 90 comprises an integral frame 100 which is formed with an aperture 102 covered exteriorly by a magnifying lens 104 which is mounted by the frame and provides magnification to the order of about 20×.

The frame 100 includes a bore 106 substantially normal to the aperture 102. A drum 108 is rotatably positioned within the bore 106 and mounts prism 110, having substantially flat faces, which in the embodiment of the invention disclosed herein total six, of which four are adapted to be displaced through the aperture 102. In this connection, a prism can be selected with any number of faces, depending upon the particular conditions and requirements. The drum 108 includes four integral arm extensions 112 which are spaced from one another and are adapted to embrace the respective four corners of the prism 110 which are adapted to traverse aperture 102. The prism 110, with its associated arm extensions 112, are adapted to function as a shutter, with the arm extensions 112 being suitably processed as to be opaque so that they are capable of blocking out inefficient parts of the prism 110 to thereby avoid viewing therethrough latent images. Under the circumstances, the prism 110, as well as the lens 104, may be formed from an acrylic plastic possessing superior optical properties. Obviously, glass can be employed for such purposes. As will be apparent shortly, each 90 degree rotational movement of the prism 110 will be effected for each picture frame movement of film 30 across the aperture 102.

The distal end of the drum 108 is formed with circumferential gear teeth 114, as well as a radially extending flange 116 which cooperates to prevent undesirable axial shifting of the drum 108. The frame 100 rotatably mounts a sprocket wheel 118 which is fixedly mounted on a shaft 120 having a threaded extension 122. This extension receives gear 124 which is adjustably anchored thereto by means of nut 126. This gear 124 cooperates with flange 116 for the stated purpose and meshes with the gear 114. Consequently, the prism 110 is adapted to rotate in response to rotation of the sprocket wheel 118. In this connection, the sprocket wheel 118 includes the usual radially extending sprockets 128 which are adapted to engage the sprocket openings 36 in the film 30. The sprocket wheel 118 is slightly recessed along its periphery 130 for purposes of eliminating its contact with the picture frame part of film 30. In addition, the sprocket wheel 118 includes a first series 132 and second series 134 of radially extending pins which serve as spacers in assuring the proper alignment of the film 30 and its engagement with the sprockets 128.

A film guide frame 140 may be releasably mounted on the eye piece frame 100. In this connection, this guide frame 140 may include a pair of laterally extending arms 142 and 144, both of which, respectively, are formed with ridges 146 and 148. For purposes that will be readily apparent, this guide frame is formed from a light-transparent material possessing some degree of resiliency and flexibility. Accordingly, the arms 142 and 144 will be cammed outwardly as the ridges 146 and 148 are passed through spaced eye piece frame openings 150 and 152, respectively, to ultimately spring back and latch with the opposed side face of the eye piece frame 100. The guide frame 140 additionally includes a laterally extending shaft 154 which includes a reduced terminal tip 156 which, in turn, is adapted to be disposed in bore 158 formed in the eye piece frame 100. This shaft 154 is adapted to rotatably mount guide spool 160 for the film 30. As is the case with similarly constructed spool 92, the spool 160 includes a circumferentially extending recessed face 162 which is so formed to eliminate surface-to-surface contact of the spool with the picture frame part of the film 30. As will be observed, the guide frame 140 includes a laterally projecting integral plate 164 which is aligned with aperture 102 of the eye piece frame 100 when the frame 140 is properly mounted on frame 100, and, to this end, functions as a diffuser for a light source which passes through the mounted film 30 through the aperture 102.

A battery-operated light source 170 is interiorly mounted on the case cover 22. This built-in illumination includes a post 172 extending integrally from the case cover 22 for anchoring a conductive angle plate 174 having a tapped bore 176 for threadedly receiving a lamp or light 178. Similarly, a conductive angle plate is anchored directly to the inner face of the case 22 for engaging the base of the lamp 178. A battery support comprises an upper plate 182 and lower plate 184 extending laterally from the inner face of the case 22. Thus, in the illustrated embodiment, a pair of batteries 186 and 188 are supported between these plates with battery 186, on one hand, in conductive relationship with angle plate 180, and battery 188, on the other, in conductive relationship with the angle plate 174. A conductive plate 190 is mounted at the other end of the batteries and is in direct contact with battery 188. This plate 190 includes a contact 192 which is normally biased away from battery 186, and thus in an open position.

For purposes of closing this contact 192, and thusly close the circuit for illuminating light 178, a manually shiftable arm 194 is utilized. This arm 194 is pivotal about stud 196 extending laterally inwardly from the case cover 22 and includes a finger-pressure-applying surface 198 which extends into a correspondingly shaped opening 200 formed by both of the casing parts 22 and 24 of case 20. The arm 194 includes a lateral projection 202 having a slot 204 which is adapted to receive a stud 206 extending laterally from the case cover 22. The terminal or free end of the arm 194 is adapted to engage the normally open contact 192. When it is desired to actuate the light 178, finger pressure is applied to the surface 198 to pivot the arm 194 about the stud 196. Under such circumstances, the stud 206 will ride in slot 204 while the free end of the arm 194 will urge the contact 192 into a closed position at which it bears against the battery 186 in conductive relationship. The stud 206 cooperates with the slot 204 in assuring proper closing of the contact 192 by preventing excessive relative movement between the free end of the arm 194 and the contact 192.

In loading the motion picture viewer of the present embodiment, the casing covers 22 and 24 are disengaged and separated. The film supply reel 32, with its wound motion picture film 30 to be viewed, as well as take-up reel 34, are mounted on their respective gears 44 and 46. The film 30 is then passed over the sprocket wheel 118, over aperture 102, spools 160 and 92, and onto the take-up reel 34 in a manner clearly illustrated in FIG. 3. The casing covers 22 and 24 are then latched to one another.

To view the motion picture film 30, the case 20 is grasped in the left hand and finger pressure applied to the arm 194 by means of the surface 198. The light 178 is thus illuminated and the film 30 then adapted to be viewed by looking through the lens 104 into the aperture 102. The crank 82 through handle 84 is turned clockwise at a speed corresponding to the desired rate at which one desires to view the motion picture film 30. The prism 110 and associated opaque arms 112, under these conditions, function to permit the sequential viewing of a single picture frame with every 90 degree rotational displacement of the prism 110. In this connection, only one frame at a time can be viewed, the speed at which the film 30 travels varied at will and the movement of the film 30 stopped at any desired point.

To rewind or, on the other hand, view the motion picture film 30 in reverse, the crank 82 is turned counterclockwise to thereby rewind the film 30 on the film supply reel 32.

To unload, the case covers 22 and 24 are unlatched from one another and the film supply reel 32 removed with the film 30 taken off its guide system, out of the eye piece 90, and from the take-up reel 34.

Thus, an automatic-action motion picture viewer is provided incorporating an effective forward-and-reverse drive mechanism for either viewing or rewinding purposes. As will be evident, the viewer is completely portable and may be taken and used substantially anywhere at any time. To this end, the viewer may be placed in substantially any conventional pocket or purse. A relatively inexpensive built-in illumination is included using conventional pen-lite batteries. Standard 50 ft. 8 mm. film reels may be employed and a relatively bright contrasting picture obtained which is subject to 20 times magnification. As will be appreciated, the viewer is provided with recessed surfaces along the path of travel of the film for purposes of eliminating surface-to-surface contact with the picture frame part of such film. Automatic drop-in loading, as well as rapid rewind, is present, with the overall operation being relatively simple and foolproof. A relatively smooth and quiet drive mechanism is provided which may employ nylon gears possessing a relatively low coefficient of friction, and consequently will require no lubrication under the contemplated conditions of use. Furthermore, expense may be effectively minimized by the fabrication of a majority of the viewer components from a suitable synthetic resin in accordance with such material designations as illustrated in the drawings.

Thus, the aforenoted objects and advantages are most effectively attained. Although a single preferred embodiment has been illustrated and described, it must be understood that this present invention is in no sense limited thereby and its scope is to be determined by the appended claims.

I claim:

1. A viewer comprising: a casing; an eye piece presented by said casing and having an aperture through which film is adapted to be viewed; guide means for guiding said film past said aperture; a supply reel gear rotatably mounted on said casing; a film supply reel coupled for rotation with said supply reel gear for mounting said film; a take-up reel gear rotatably mounted on said casing; a take-up reel coupled for rotation with said take-up reel gear for receiving said film as it is guided past said aperture; drive means for selectively driving said take-up reel and said supply reel for respectively winding said film on said take-up reel and rewinding said film on said supply reel, said drive means including a rotatably driven floating gear mounted on said casing and having external and internal gear teeth, said floating gear being shiftable along a predetermined path between a first drive position at which the external teeth mesh with said take-up reel gear to drive said take-up reel and a second position at which the external teeth mesh with said supply reel gear to drive said supply reel; a stationary pinion gear rotatably mounted on said casing and engaged with the internal gear teeth of said shiftable gear; means for rotatably driving said pinion gear; and the internal gear teeth of said shiftable gear being so constructed and arranged that upon rotation of the stationary pinion gear in one direction the shiftable gear shifts into engagement with the take-up reel gear and upon rotation of said stationary pinion gear in the other direction the shiftable gear shifts to engage the supply reel gear to respectively drive said take-up reel and said supply reel.

2. The invention in accordance with claim 1 wherein the reel gears are so constructed and arranged that for a particular rate of rotation of said shiftable gear the rate of rotation of the supply reel to the take-up reel is in a ratio equal to more than 1:1.

3. The invention in accordance with claim 1 wherein said casing is comprised of a pair of releasably associated parts which are releasable upon the application of manual pressures to thereby provide access to the interior of said casing.

4. The invention in accordance with claim 1 wherein said eye piece includes a magnifying lens in alignment with said aperture, a shutter means disposed interiorly of said casing with respect to said lens for alternately opening and closing said aperture, a light source communicable with said aperture from a direction substantially in alignment therewith for impinging on said lens through said shutter means, and synchronization means for synchronizing the movement of said shutter means and said film past said aperture.

5. The invention in accordance with claim 4 wherein said light source includes a lamp assembly coupled with a source of electrical energy interiorly of said casing, and a switch means is on said casing for permitting actuation of said lamp assembly by said source of electrical energy.

6. The invention in accordance with claim 4 wherein said shutter means includes a prism and opaque means proximate certain of the corners of said prism, said eye piece further including means for rotating said prism in response to displacement of said film, and said means for rotating said prism including a sprocket wheel having sprocket teeth extending therefrom for engaging with the sprocket receiving openings of said film.

References Cited in the file of this patent
UNITED STATES PATENTS

| | | |
|---|---|---|
| 1,595,997 | Cocanari | Aug. 17, 1926 |
| 1,624,103 | Knopp | Apr. 12, 1927 |
| 1,655,299 | Thornton | Jan. 3, 1928 |
| 1,997,642 | Klein | Apr. 16, 1935 |
| 2,094,669 | Pratt | Oct. 5, 1937 |
| 2,346,472 | Contner | Apr. 11, 1944 |
| 2,495,047 | Afton et al. | Jan. 17, 1950 |
| 2,583,385 | Miller | June 22, 1952 |
| 2,611,551 | Collins | Sept. 23, 1952 |
| 2,623,702 | Masterson | Dec. 30, 1952 |
| 2,628,526 | Coffey | Feb. 17, 1953 |
| 2,806,658 | Truesdale | Sept. 17, 1957 |
| 2,905,050 | Castedello et al. | Sept. 22, 1959 |